(12) United States Patent
Birch et al.

(10) Patent No.: US 10,398,130 B2
(45) Date of Patent: Sep. 3, 2019

(54) ANIMAL CONTROL AROUND RESTRICTED ZONES

(71) Applicant: Intel Corporation, Santa Clara, CA (US)

(72) Inventors: Thomas A. Birch, Portland, OR (US); David I Poisner, Carmichael, CA (US)

(73) Assignee: Intel Corporation, Santa Clara, CA (US)

(*) Notice: Subject to any disclaimer, the term of this patent is extended or adjusted under 35 U.S.C. 154(b) by 302 days.

(21) Appl. No.: 15/582,081

(22) Filed: Apr. 28, 2017

(65) Prior Publication Data

US 2018/0310526 A1 Nov. 1, 2018

(51) Int. Cl.
| | | |
|---|---|---|
| *A01M 31/00* | (2006.01) |
| *A01K 15/02* | (2006.01) |
| *A01K 29/00* | (2006.01) |
| *A01M 29/00* | (2011.01) |
| *A01K 11/00* | (2006.01) |

(52) U.S. Cl.
CPC .......... *A01K 15/023* (2013.01); *A01K 11/006* (2013.01); *A01K 29/005* (2013.01); *A01M 29/00* (2013.01); *A01M 31/002* (2013.01)

(58) Field of Classification Search
CPC .. A01K 15/023; A01K 29/005; A01K 11/006; A01M 29/00; A01M 31/002
See application file for complete search history.

(56) References Cited

U.S. PATENT DOCUMENTS

| | | | |
|---|---|---|---|
| 7,462,364 B2 | 12/2008 | Bell et al. | |
| 2005/0232083 A1* | 10/2005 | Borsina | A01K 15/02 367/139 |
| 2006/0174533 A1 | 8/2006 | Rusciano et al. | |
| 2013/0257641 A1 | 10/2013 | Ronning | |
| 2016/0286785 A1 | 10/2016 | Nichols et al. | |
| 2018/0168130 A1* | 6/2018 | Wu | A01M 29/12 |

FOREIGN PATENT DOCUMENTS

| | | | |
|---|---|---|---|
| CN | 203276488 U | 11/2013 | |
| WO | WO-2004010762 A2 * | 2/2004 | ............ A01M 1/023 |

\* cited by examiner

*Primary Examiner* — Nabil H Syed

(74) *Attorney, Agent, or Firm* — Schwegman Lundberg & Woessner, P.A.

(57) ABSTRACT

Various systems and methods for implementing animal control systems are provided herein. A monitoring system for influencing animal behavior includes a processor subsystem to: receive, at the monitoring system, an indication of an animal proximate to a restricted area; determine whether to activate a repellent device and an attractant device to maneuver the animal away from the restricted area; and activate the repellent device and the attractant device when the determination is positive.

21 Claims, 5 Drawing Sheets

US 10,398,130 B2

ANIMAL CONTROL AROUND RESTRICTED ZONES

TECHNICAL FIELD

Embodiments described herein generally relate to land protection systems and in particular to implementing animal control around restricted zones.

BACKGROUND

Free range farming husbandry is a technique where animals are allowed to roam freely outdoors. The free ranging area may be fenced in, but because of the size of the range, the animals have a substantial area to roam. Open range husbandry is similar to free range husbandry, but in open range husbandry the herd is allowed to roam freely regardless of the land ownership. In open ranging herds from several farmers may mix. With the extensive locomotion provided by free range or open range farming husbandry, it is difficult to monitor or control the herd.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

In free range or open range farms, borders of the farming land may abut private, government, or other land that is excluded from the grazing land. Additionally, farmers may want to keep animals away from certain areas of land permanently or temporarily (e.g., seasonally). For instance, a farmer may wish to protect a wetland area that is in or adjacent to grazing area. As another example, a government entity may desire to keep animals from grazing in a national park or other sensitive zone. Because of the large acreage involved, constructing and maintaining fences or other physical barriers is not cost-effective. Additionally, physical barriers are not easily adapted for seasonal or temporary usage. What is needed is a system to manage animal movement and behavior in these situations.

Figure 1:
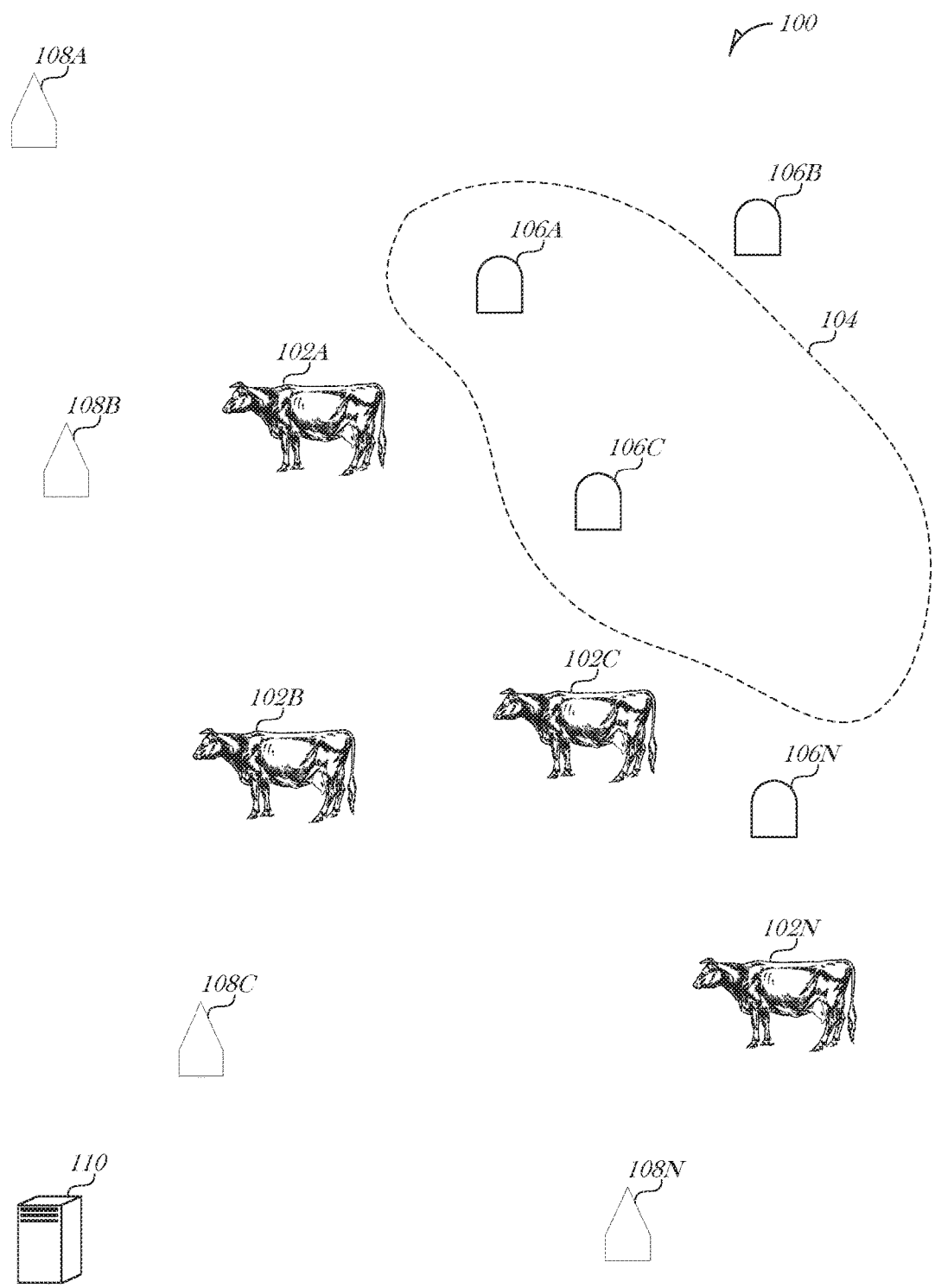
FIG. 1 is a schematic diagram illustrating a range environment, according to an embodiment.

FIG. 1 is a schematic diagram illustrating a range environment 100, according to an embodiment. The range environment 100 may be a free range or open range, and may be used to graze one or more herds of one or more types of animals. For instance, cows and goats may graze in the range environment 100, or cows owned by two different farms may graze coextensively in the range environment 100.

The range environment 100 includes one or more animals 102A-N (collectively referred to as 102). The animals 102 may be any type of range animal including, but not limited to cattle, horses, sheep, goats, lamas, buffalos, or the like. The animals 102 may be allowed to roam throughout the entire range environment 100 except for a restricted zone 104 (e.g., a protected zone). While only one restricted zone 104 is illustrated in FIG. 1, it is understood that several restricted zones may be active at any given time. Restricted zones 104 may be constructed either permanently or temporarily around features, such as a salmon spawning area in a river, a wetland area, a sinkhole or other land hazard, a partially frozen lake, an oil pump jack or other man-made structure, etc.

One or more animal repellent devices 106A-N (collectively referred to as 106) and one or more animal attractant devices 108A-N (collectively referred to as 108), may be situated in or around the range environment 100.

Animal repellent devices 106 may include animal sensing mechanisms, various mechanisms for repelling animals, and communication subsystems. Animal repellent devices 106 may act independently or in coordination with one or more other animal repellent devices 106 or animal attractant devices 108. Sensing mechanisms may be optical (e.g., camera-based), LIDAR (light detection and ranging), RADAR (radio detection and ranging), acoustic (e.g., a microphone), or other object detection mechanisms. Additionally, the animal sensing mechanism may include a transceiver capable of polling for and detecting an electronic tracking device. Example systems that use electronic tracking include passive radio frequency identification (RFID) systems, Bluetooth tags, and the like. Animals 102 may be tagged with a tracking device (e.g., tagged through the ear, equipped with a collar, subdermal implantation, etc.), such that when they approach an animal repellent device 106, the repellent device 106 sensed them. Other mechanisms for sensing an animal 102 may be used in an animal repellent device 106.

Additionally, an animal repellent device 106 may include communication systems, such as a cellular radio, satellite radio, Bluetooth radio, or other wired or wireless communication mechanisms. In an example, the repellent device 106 is equipped with a long-range, low power communication standard, such as LoRa® from Semtech. The animal repellent device 106 may use the communication system to communicate with other repellent devices 106 or attractant devices 108, or with a central server 110. The central server 110 may be used to coordinate the repellent devices 106 and attractant devices 108, log activities, monitor animal positions, and perform other functions described in this document. The central server 110 may be located in the field (e.g., in range environment 100), in the cloud, at a service building (e.g., at the farmer's house), on a mobile device (e.g., the farmer's laptop, smart-phone, wearable device, etc.), or elsewhere. While coordination may be performed by the central server 110 in some embodiments, in other embodiments the coordination is performed by one of the repellent devices 106 or attractant devices 108.

The animal repellent device 106 may be powered by one or more batteries, which may be rechargeable using environmental sources. For instance, the repellent device 106 may include solar recharging, wind recharging, or other recharging mechanisms that allow the repellent device 106 to operate for long periods in the field. Alternatively, the repellent device 106 may be powered using mains electric power, such as via buried cables or suspended wires.

The repellent device 106 may include one or more mechanisms to repel or deter animals from approaching the repellent device 106. Repellent/deterrent mechanisms include, but are not limited to audio, light, vibration, or olfactory mechanisms. For instance, bright lights, loud noises, or shaking ground, may startle or scare an animal 102 and cause it to run away. Predatory scents (e.g., a wolf scent) or noises (e.g., a wolf howl) may deter an animal 102 from approaching. Combinations of modalities and mechanisms may be used. The mechanisms may be tailored to the type of animal 102 being repelled. The tailoring may be pre-configured (e.g., by a farmer or a system administrator), or configured on the fly. For instance, the repellent device 106 may query an RFID tag of an animal 102 and determine the type of animal, which may then be used to configure the type, number, magnitude, or configuration of a repellent mechanism to use.

When several repellent devices 106 are installed or positioned in a certain manner, the repellent devices 106 create a boundary that cordons off some or all of a restricted zone 104. Repellent devices 106 may be placed within a restricted zone 104 or outside of the boundary of a restricted zone 104, or in some combination, depending on the type of zone, how close animals are allowed to approach, the type of repellent and its efficacy, aesthetic considerations, and other factors.

In a similar fashion, the attractant devices 108 may include communication systems, power sources, and object detection mechanisms. In contrast to repellent devices 106, an attractant device 108 may include one or more and attractant mechanisms. When placed strategically, attractant devices 108 may be used in coordination with repellent devices 106 to maneuver animals 102 away from a restricted zone 104.

Attractant mechanisms include, but are not limited to audio, light, vibration, or olfactory mechanisms. For instance, the sound of an animal in heat or a young animal in distress may be used to attract animals 102. As another example, the smell of food or the sound of a food dispensing machine may be used to attract animals 102. Other modes of attracting animals are considered to be within the scope of this disclosure.

Figure 2:
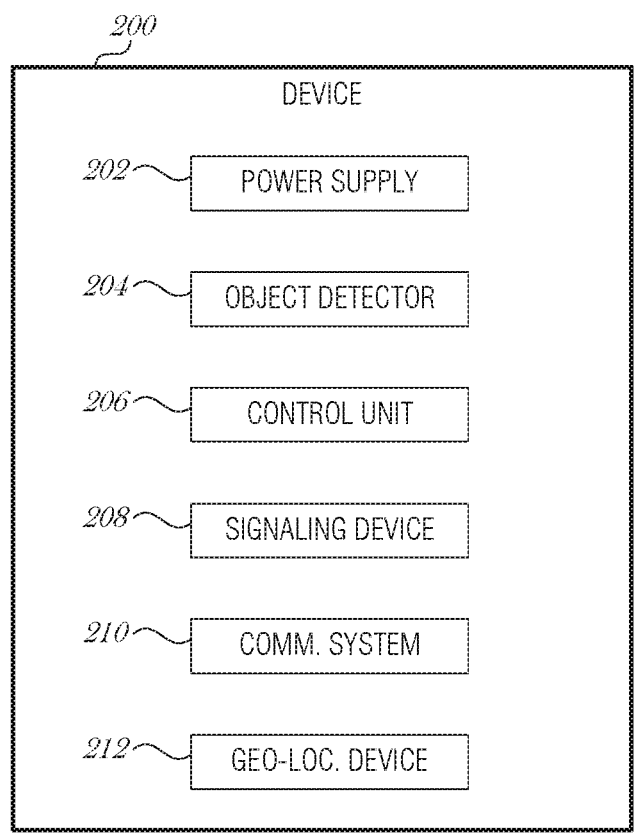
FIG. 2 is a block diagram of a device capable of acting as either a repellent device or an attractant device, or both, according to an embodiment.

FIG. 2 is a block diagram of a device 200 capable of acting as either a repellent device 106 or an attractant device 108, or both, according to an embodiment. The device 200 includes a power supply 202, an object detector 204, a control unit 206, and a signaling device 208 (e.g., a signal generator). The power supply 202 may be a battery, either rechargeable or non-rechargeable, capable of providing electrical power to the device 200. The power supply 202 may be recharged using various mechanisms, such as by way of a solar panel array, a wind turbine, a water turbine, or the like.

The object detector 204 may be a passive infrared (PIR) motion sensor, a camera-based system, an acoustic system, a tracking system, or the like. Tracking systems may use a polling mechanism, for instance to poll for the existence and proximity of RFID tags.

In some embodiments, the object detector 204 is omitted or disabled. In place of object detection at the device 200, the device 200 may be actuated remotely. For examples, a central tracking system may maintain the approximate locations of animals in the area in relation to the restricted zone. The central tracking system may then dynamically activate one or more devices 200 to repel or attract animals, in order to keep the animals from approaching or entering the restricted zone.

The signaling device 208 may be a speaker or multiple speakers to output audio, a lamp or lamp array to output light, one or more scent dispensers, a mechanical apparatus to create vibrations, or combinations of such mechanisms. The signaling device 208 may be configured to act as an attractant or a repellent. In this manner, the device 200 may be configured to act in a single mode (e.g., attractant device or repellent device), or a dual model (e.g., both attractant and repellent device). The device 200 may be used in different modes to allow for the reconfiguration and varying use of a restricted zone. For instance, during salmon spawning season a portion of a river or waterway may be zoned off from use. During the spawning time, a device 200 proximate to the water may be configured to repel animals to avoid interrupting the spawning activities. However, during non-spawning times, the device 200 may be disabled or act as an attractant device to encourage or allow animals to use the water. A range with a number of devices 200 may provide flexibility to the farmer to create dynamic geofences around different areas of land or land features. For instance, a farmer may want to avoid overgrazing in any given area by moving the herd with attractant/repellent devices on a periodic or regular basis. As another example, a farmer may use devices 200 in a coordinated fashion to round up or drive the herd to a certain location.

The phrase "proximate to" includes the case where the animal is in the restricted zone, as well the case when the animal outside of the restricted zone, but is near a border of the restricted zone. Proximity may be configured or be dependent on various factors, such as the type of animal, the type of repellents or attractants used, the terrain of the range, the history animal behavior on previous events, and the like. For example, for slow moving herd animals, proximity may be 30 or 50 feet. For more mobile animals, proximity may be larger, such as 100 or 200 feet. Different borders of a restricted area may have different proximity values.

The control unit 206 may include various electronic components, such as a processor, memory, storage, and other components, to control the device 200 and communicate with other devices (e.g., central server, other devices 200, electronic animal tags, etc.). The control unit 200 may manage power, such as controlling whether the device 200 is in active or sleep mode. The control unit 200 may also actuate the signaling device in response to some triggering condition. In general, the control unit 206 includes instructions, logic, modules, or other hardware components, which may be configured by software, to implement methods and processes described herein.

The device 200 may have optional components including a communication system 210 and a geo-location device 212. The communication system 210 may incorporate the geo-location device 212, or they may be distinct components within the device 200. The communication system 210 may include one or more radios, analog-to-digital converters, digital-to-analog converters, processors, memory, or other components to provide communication over a medium. The communication system 210 may communicate using various protocols and modes, such as Bluetooth, cellular, Wi-Fi (e.g., the 802.11 family of standards), ZigBee, or the like.

The geo-location device 212 may be used to obtain a geo-location of the device 212. The geo-location device 212 may use the Global Positioning System (GPS), Global Navigation Satellite System (GLONASS), Galileo positioning system, or the like. The geo-location device 212 may be useful when the device 200 is configured as a mobile device or incorporated into a mobile unit. For example, the device 200 may be affixed or incorporated into a terrestrial drone, enabling relocation and movement of the device 200. Navigation and control elements for such a vehicle platform may be separate from the device 200, such as being incorporated into the supporting rig. In other embodiments, the device 200 acts in the capacity to navigate, for example, by using the object detector 204 to sense navigable terrain around the device 200.

Figure 3:
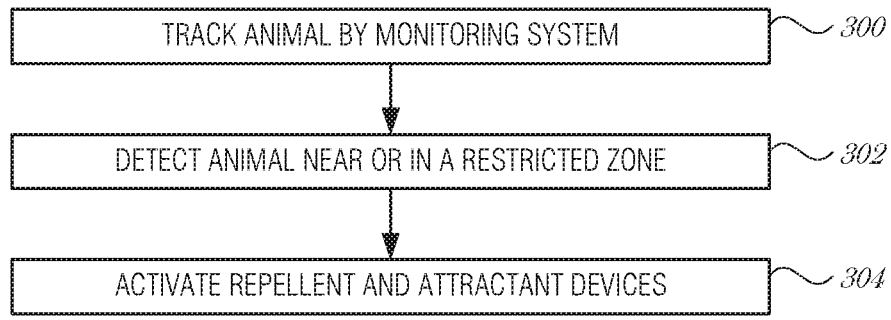
FIG. 3 is a flowchart illustrating control and data flow of a system for attracting or repelling animals, according to an embodiment.

FIG. 3 is a flowchart illustrating control and data flow of a system for attracting or repelling animals, according to an embodiment. An animal is tracked by a monitoring system (operation 300). The monitoring system may be incorporated into a repellent device or an attractant device. Optionally, the monitoring system may be operating from a separate computing device, such as a cloud server, a remote server, or the like. The monitoring system may track one or more animals, from one or more herds, of one or more farmers. For instance, the monitoring system may operate on a free range land for a single farmer. In another instance, the monitoring system may operate to monitor open range land.

The monitoring system may obtain locations of one or more animals from deployed repellent or attractant devices in the field. For example, when a repellent or attractant device detects movement using an object detector (e.g., object detector 204), then the device may report such detection to the monitoring system.

Alternatively, the monitoring system may obtain location of the animals using other mechanisms, such as by receiving periodic or regular location reports from devices on the animals, using drones or other aerial surveillance to monitor herd positions, querying devices on the animals, or the like.

When an animal or a group of animals is detected as being near on in a restricted zone (operation 302), then the monitoring system may activate one or more repellent devices and one or more attractant devices (operation 304) to maneuver the animal(s) away from the restricted zone.

Figure 4:
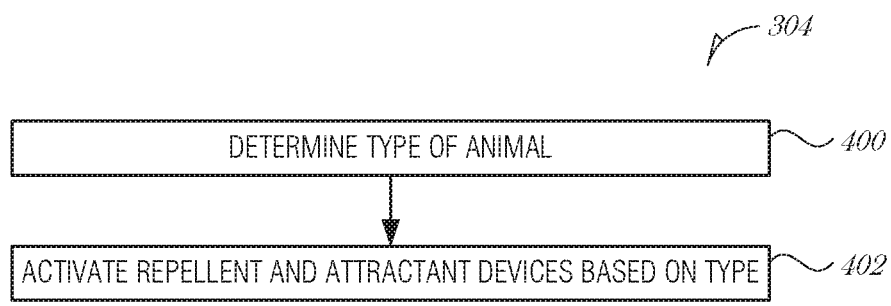
FIG. 4 is a flowchart illustrating the control flow when activating repellent and attractant devices, according to an embodiment.

FIG. 4 is a flowchart illustrating the control flow when activating repellent and attractant devices (operation 304 of FIG. 3), according to an embodiment. At operation 400, the type of animal is determined. This may be performed by a tag placed on the animal. The tag may include a unique identifier that is associated with the animal. The identifier may be coded, for example with a prefix that indicates the animal type, gender, age, birthdate, and other aspects of the animal. For example, the tag may have a prefix of a letter to indicate type of animal and a number for the birthdate of the animal, such as "C" for "cow," "B" for "bull," "S" for "steer," "T" for "stag," "L" for "calf," and the like. A prefix of "C0115 . . ." would indicate a cow that was born in the first week of the year 2015, and a prefix of "L2321 . . ." would indicate a calf born in the $23^{rd}$ week of the year 2021. Other information may be encoded in the identifier, such as a number indicating the rancher or owner of the animal, a unique identifier of the animal, etc.

Optionally, the type of animal may be obtained from a deployed repellent or attractant device. The deployed device may determine the type of animal using image recognition, a device query, audio analysis, or other mechanisms. The deployed device may then report the type of animal near the restricted area to the monitoring system.

Based on the type of animal, at operation 402, the monitoring system may activate one or more repellent devices and one or more attractant devices using specific repellent and attractant mechanisms that are more likely to be effective on the type of animal.

Optionally in operation 402, the monitoring system may activate, or cause to activate, repellent or attractant mechanisms in a certain sequence. For instance, the use of both a repellent and an attractant mechanism close in time may confuse the animal. Instead, a repellent may be activated seconds or minutes after an attractant is used. Optionally, the repellent may be used before the attractant. The sequence, timing, intensity, number or uses, and other aspects of the repellent and attractant activations may be configured based on the type of animal or even for a specific animal. For example, one particular cow may not react to loud noises due to a hearing loss or behavioral conditioning. As such, a gunshot sound may not deter or repel that cow. Instead, a high pitched siren may be used to startle and repel the cow. The cow may be uniquely identified with an RFID tag, for instance, and the specific audio (e.g., high-pitched siren) may be used in conjunction with a gunshot sound to repel both the one cow and other cows that are with her.

In another aspect, the use of the repellent and attractant devices and their corresponding mechanisms, are used in a cascading fashion. One group of repellent devices (or even a single device), for example, may be actuated. As the herd moves away, another group of repellent devices may be used to continue to drive the herd away from an area. Cascading may also be used in conjunction with alternating between repellent devices and attractant devices to maneuver the herd.

Figure 5:
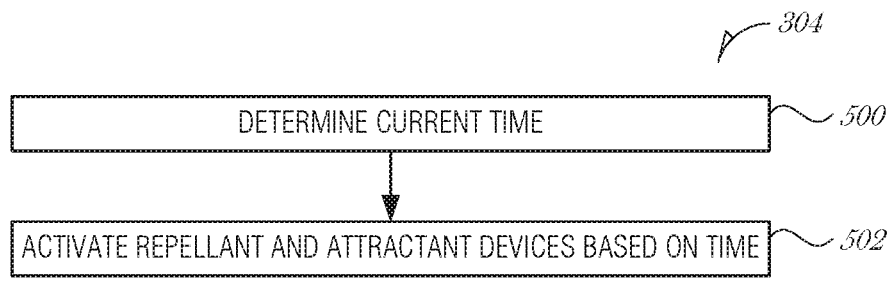
FIG. 5 is a flowchart illustrating the control flow when activating repellent and attractant devices, according to an embodiment.

FIG. 5 is a flowchart illustrating the control flow when activating repellent and attractant devices (operation 304 of FIG. 3), according to an embodiment. At operation 500, a current time is determined. The current time is used to conditionally enforce the restricted zone. At operation 502, based on the current time, the repellent device(s) and attractant device(s) are activated. In some cases, the zone is restricted for certain times of the day (e.g., only during the morning hours). In other cases, the zone is restricted for certain days of the week, or other time periods. Using a time-based restricted zone is similar to time-based geofence technologies. The restricted zones may be configured by an administrator (e.g., farmer). The configuration may restrict use of a zone for events, time periods, temporarily, etc. For instance, the farmer may restrict use of the stream during salmon spawning seasons. Another example is to restrict certain areas of the range for certain hours of the day. This may encourage herd movement and discourage overgrazing in any one particular part of the range.

The animal tracking mechanisms described herein may also be used for other purposes, such as for taking a census, animal herd movement analysis, detecting injured or deceased animals, detecting stray animals, and the like.

Figure 6:
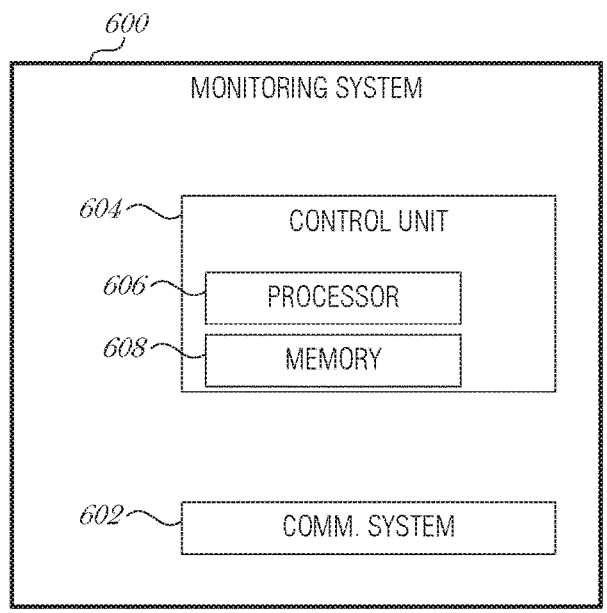
FIG. 6 is a schematic diagram illustrating a monitoring system, according to an embodiment.

FIG. 6 is a schematic diagram illustrating a monitoring system 600, according to an embodiment. Portions of the monitoring system 600 may be incorporated into an attractant device, a repellent device, a server computer, a desktop computer, a laptop, a wearable device, a hybrid device, or other compute device capable of receiving and processing data.

The monitoring system 600 includes a communication system 602 and a control unit 604. The communication system 602 includes various radios, digital signal processors, storage, and other components to provide short or long range communication. The communication system 602 may be used by the monitoring system 600 to communicate with a repellent or attractant device, a server computer, a cloud service, a user device, or the like. The communication system 602 may support various communication protocols including, but not limited to LoRa, Bluetooth, Wi-Fi, 3G, and 4G LTE/LTE-A or WiMAX networks.

The control unit 604 includes various components, such as a processor 606 and memory 608. The processor may be a processor subsystem, including one or more cores, specialized sub-processors, cache memory, and the like. The memory 608 may be volatile or non-volatile random access memory (RAM). The memory 608 may be in various form factors, such as a dual in-line memory module (DIMM), a flash memory device, or the like.

In an embodiment, the communication system 602 is configured to receive an indication of an animal proximate to a restricted area.

The memory 608 may include instructions, which when executed by the processor 606, cause the processor 606 to determine whether to activate a repellent device and an attractant device to maneuver the animal away from the restricted area and activate the repellent device and the attractant device when the determination is positive.

In an embodiment, the monitoring system 600 includes the repellent device. In another related embodiment, the monitoring system 600 includes the attractant device. In another related embodiment, the monitoring system 600 is incorporated into a user device.

In an embodiment, to receive the indication of the animal being proximate to the restricted area, the processor 606 is to receive an animal identifier from a device deployed proximate to the restricted area. In various embodiments, the device is the repellent device or the attractant device.

In an embodiment, the animal identifier includes a unique identifier to uniquely identify the animal. In a related embodiment, the animal identifier includes a code indicating a type of the animal. In a related embodiment, the animal identifier includes a code indicating a gender of the animal. In a related embodiment, the animal identifier includes a code indicating an age of the animal. In a related embodiment, the animal identifier includes a code indicating a birthdate of the animal.

In an embodiment, the animal identifier is stored on the animal in a portable device. In a related embodiment, the portable device comprises an ear tag. In a related embodiment, the portable device comprises an electronic collar. In a related embodiment, the portable device comprises a radio frequency identification (RFID) tag. In a related embodiment, the portable device comprises an Internet-of-Things (IoT) device.

In an embodiment, to receive the indication of the animal being proximate to the restricted area, the communication system 602 is to communicate with a device on the animal to obtain a location of the animal and compare the location of the animal with a geographical boundary of the restricted area. In an embodiment, to communicate with the device on the animal, the communication system 602 is to receive a regular transmission from the device on the animal, the regular transmission reporting the location of the animal. In a related embodiment, to communicate with the device on the animal, the communication system 602 is to transmit a query to the device on the animal and receive a response from the device on the animal, the response including the location. In a related embodiment, to communicate with the device on the animal, the communication system 602 is to implement a long range, low power communication protocol to communicate with the device on the animal.

In an embodiment, to determine whether to activate the repellent device and the attractant device to maneuver the animal away from the restricted area, the processor 602 is to determine a current time and determine whether the restricted area is actively restricted based on the current time.

In an embodiment, to activate the repellent device and the attractant device when the determination is positive, the processor 602 is to activate the repellent device and the attractant device simultaneously.

In an embodiment, to activate the repellent device and the attractant device when the determination is positive, the processor 602 is to activate the repellent device and the attractant device in a temporal sequence. In a further embodiment, the temporal sequence is configurable.

In an embodiment, to activate the repellent device and the attractant device when the determination is positive, the processor 602 is to activate the attractant device, the attractant device having a mean time of effectiveness and activate the repellent device after the mean time of effectiveness.

In an embodiment, to activate the repellent device and the attractant device when the determination is positive, the processor 602 is to activate the repellent device, the repellent device having a mean time of effectiveness and activate the attractant device after the mean time of effectiveness.

In an embodiment, to activate the repellent device and the attractant device when the determination is positive, the processor 602 is to repeatedly activate the repellent device and the attractant device in an alternating sequence.

In an embodiment, to activate the repellent device and the attractant device when the determination is positive, the processor 602 is to determine a type of the animal and activate the repellent device and the attractant device based on the type of animal.

In an embodiment, to activate the repellent device and the attractant device when the determination is positive, the processor 602 is to determine an identification of the animal and activate the repellent device and the attractant device based on the identification. In a further embodiment, the processor 602 is to determine an efficacy of the repellent device and the attractant device and store the efficacy. In a further embodiment, the processor 602 is to modify how the repellent device and attractant device are activated in a subsequent activation based on the efficacy.

Figure 7:
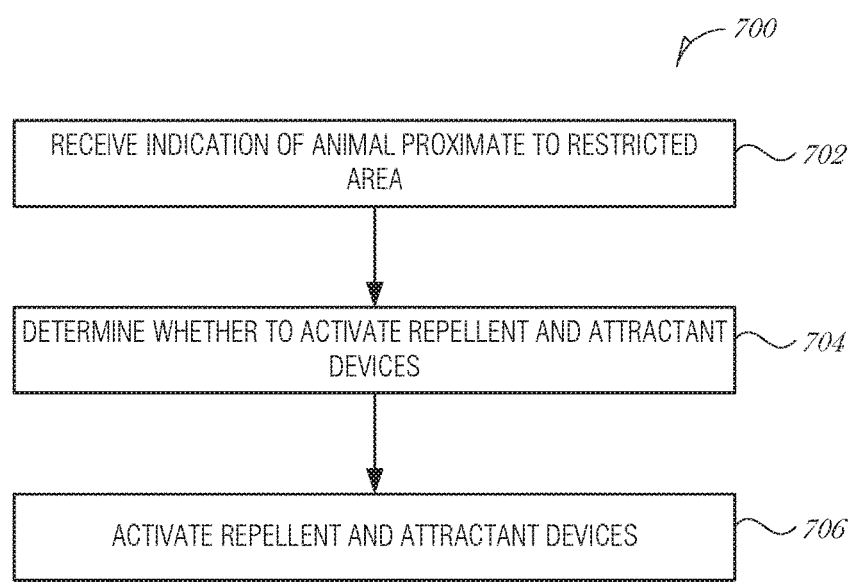
FIG. 7 is a flowchart illustrating a method for influencing animal behavior, according to an embodiment.

FIG. 7 is a flowchart illustrating a method 700 for influencing animal behavior, according to an embodiment. At block 702, an indication of an animal proximate to a restricted area is received at a monitoring system. The phrase "proximate to" includes the case where the animal is in the restricted zone, as well the case when the animal outside of the restricted zone, but is near a border of the restricted zone. Proximity may be configured or dependent on various factors, such as the type of animal, the type of repellents or attractants used, the terrain of the range, the history animal behavior on previous events, and the like. For example, for slow moving herd animals, proximity may be 30 or 50 feet. For more mobile animals, proximity may be larger, such as 100 or 200 feet. Different borders of a restricted area may have different proximity values.

In an embodiment, the monitoring system is incorporated into the repellent device. In another embodiment, the monitoring system is incorporated into the attractant device. In yet another embodiment, wherein the monitoring system is incorporated into a user device. The user device may be a laptop computer, desktop computer, server, hybrid computer, wearable device, smartphone, mobile handheld device, or the like. The monitoring system may be a cloud-based service in another embodiment.

At block 704, it is determined whether to activate a repellent device and an attractant device to maneuver the animal away from the restricted area.

At block 706, the repellent device and the attractant device are activated when the determination at block 704 is positive.

In an embodiment, receiving the indication of the animal being proximate to the restricted area comprises receiving an animal identifier from a device deployed proximate to the restricted area. In a related embodiment, the device is the repellent device. In another related embodiment, the device is the attractant device.

In an embodiment, the animal identifier includes a unique identifier to uniquely identify the animal. In a related embodiment, the animal identifier includes a code indicating a type of the animal. In another related embodiment, the animal identifier includes a code indicating a gender of the animal. In another related embodiment, the animal identifier includes a code indicating an age of the animal. In another related embodiment, the animal identifier includes a code indicating a birthdate of the animal.

In an embodiment, the animal identifier is stored on the animal in a portable device. The portable device may be any type of device, such as a RFID tag, a low powered beacon, or the like. In an embodiment, the portable device comprises an ear tag. In an embodiment, the portable device comprises an electronic collar. In an embodiment, the portable device comprises a radio frequency identification (RFID) tag. In an embodiment, the portable device comprises an Internet-of-Things (IoT) device.

In an embodiment, receiving the indication of the animal being proximate to the restricted area comprises communicating with a device on the animal to obtain a location of the animal, and comparing the location of the animal with a geographical boundary of the restricted area. In a further embodiment, communicating with the device on the animal comprises receiving a regular transmission from the device on the animal, the regular transmission reporting the location of the animal. In another embodiment, communicating with the device on the animal comprises transmitting a query to the device on the animal and receiving a response from the device on the animal, the response including the location. In another embodiment, communicating with the device on the animal comprises implementing a long range, low power communication protocol to communicate with the device on the animal. Examples include Bluetooth Low Energy, LoRa, and the like.

In an embodiment, determining whether to activate the repellent device and the attractant device to maneuver the animal away from the restricted area comprises determining a current time and determining whether the restricted area is actively restricted based on the current time.

In an embodiment, activating the repellent device and the attractant device when the determination is positive comprises activating the repellent device and the attractant device simultaneously.

In an embodiment, activating the repellent device and the attractant device when the determination is positive comprises activating the repellent device and the attractant device in a temporal sequence. In a further embodiment, the temporal sequence is configurable.

In an embodiment, activating the repellent device and the attractant device when the determination is positive comprises activating the attractant device, the attractant device having a mean time of effectiveness and activating the repellent device after the mean time of effectiveness. Mean time of effectiveness may be determined by experimentation and observation. By activating the attractant device first, the monitoring system may not have to activate the repellent device if the animal moves away from the restricted zone. Furthermore, by allowing the mean time of effectiveness to pass before activating the repellent device, the animal is not distracted from the attractant.

In an embodiment, activating the repellent device and the attractant device when the determination is positive comprises activating the repellent device, the repellent device having a mean time of effectiveness and activating the attractant device after the mean time of effectiveness. For example, a loud sound may startle a cow and make her move away. The time from the sound being made to the time when the cow is effectively out of range of the restricted zone or the repellent device may be measured. A period may be used to allow the cow to relax a little before an attractant device is activated. In this way, the cow is able to detect the attractant without being in a fear state caused by the repellent.

In an embodiment, activating the repellent device and the attractant device when the determination is positive comprises repeatedly activating the repellent device and the attractant device in an alternating sequence. The attractant and repellent may be used in an alternating fashion to coax the animal to a position away from the restricted zone. When multiple repellent and attractant devices are used in concert, the animal may be moved on longer paths.

In an embodiment, activating the repellent device and the attractant device when the determination is positive comprises determining a type of the animal and activating the repellent device and the attractant device based on the type of animal. In an embodiment, activating the repellent device and the attractant device when the determination is positive comprises determining an identification of the animal and activating the repellent device and the attractant device based on the identification. In some further embodiments, the method 700 includes determining an efficacy of the repellent device and the attractant device and storing the efficacy. The efficacy may be stored at the monitoring system or remote from the monitoring system. Based on the efficacy, the method 700 may include modifying how the repellent device and attractant device are activated in a subsequent activation. Timing, intensity, which sounds, vibrations, or other repellent or attractant is used, and other aspects of how the repellent device and attract device are activated may be altered from use to use to ensure an effective and reliable system.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instructions on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 8:
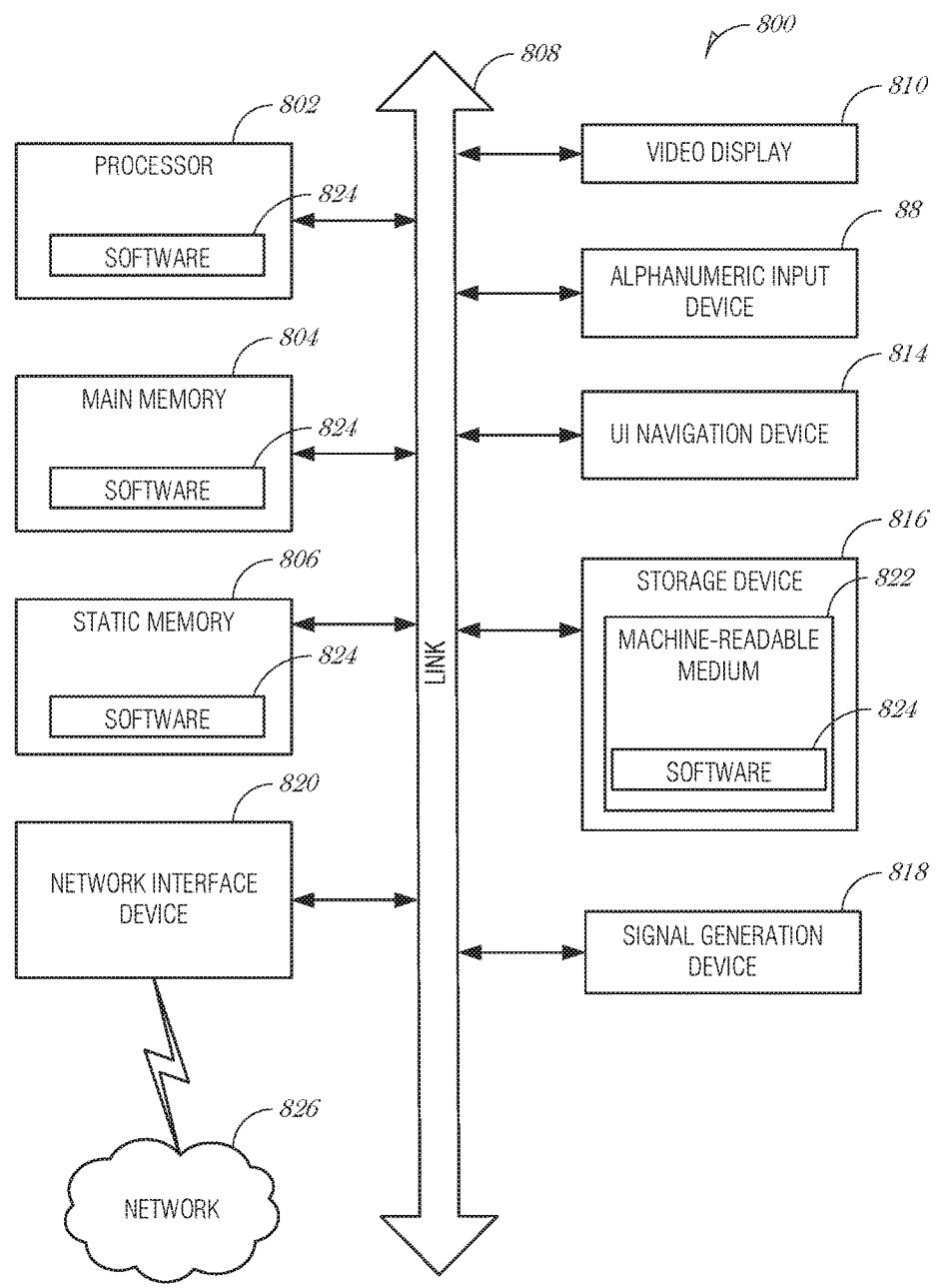
FIG. 8 is a block diagram illustrating an example machine upon which any one or more of the techniques (e.g., methodologies) discussed herein may perform, according to an example embodiment.

FIG. 8 is a block diagram illustrating a machine in the example form of a computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (CPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (CPS) sensor, compass, accelerometer, gyrometer, magnetometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Network interface device 820 may be configured or programmed to implement the methodologies described herein. In particular, the network interface device 820 may provide various aspects of packet inspection, aggregation, queuing, and processing. The network interface device 820 may also be configured or programmed to communicate with a memory management unit (MMU), processor 802, main memory 804, static memory 806, or other components of the system 800 over the link 808. The network interface device 820 may query or otherwise interface with various components of the system 800 to inspect cache memory; trigger or cease operations of a virtual machine, process, or other processing element; or otherwise interact with various computing units or processing elements that are in the system 800 or external from the system 800.

ADDITIONAL NOTES & EXAMPLES

Example 1 is a monitoring system for influencing animal behavior, the monitoring system comprising: a communication system to receive an indication of an animal proximate to a restricted area; a processor; and memory having instructions, which when executed by the processor, cause the processor to: determine whether to activate a repellent device and an attractant device to maneuver the animal away from the restricted area; and activate the repellent device and the attractant device when the determination is positive.

In Example 2, the subject matter of Example 1 optionally includes wherein the monitoring system includes the repellent device.

In Example 3, the subject matter of any one or more of Examples 1-2 optionally include wherein the monitoring system includes the attractant device.

In Example 4, the subject matter of any one or more of Examples 1-3 optionally include wherein the monitoring system is incorporated into a user device.

In Example 5, the subject matter of any one or more of Examples 1-4 optionally include wherein to receive the indication of the animal being proximate to the restricted area, the processor is to: receive an animal identifier from a device deployed proximate to the restricted area.

In Example 6, the subject matter of Example 5 optionally includes wherein the device is the repellent device.

In Example 7, the subject matter of any one or more of Examples 5-6 optionally include wherein the device is the attractant device.

In Example 8, the subject matter of any one or more of Examples 5-7 optionally include wherein the animal identifier includes a unique identifier to uniquely identify the animal.

In Example 9, the subject matter of any one or more of Examples 5-8 optionally include wherein the animal identifier includes a code indicating a type of the animal.

In Example 10, the subject matter of any one or more of Examples 5-9 optionally include wherein the animal identifier includes a code indicating a gender of the animal.

In Example 11, the subject matter of any one or more of Examples 5-10 optionally include wherein the animal identifier includes a code indicating an age of the animal.

In Example 12, the subject matter of any one or more of Examples 5-11 optionally include wherein the animal identifier includes a code indicating a birthdate of the animal.

In Example 13, the subject matter of any one or more of Examples 5-12 optionally include wherein the animal identifier is stored on the animal in a portable device.

In Example 14, the subject matter of Example 13 optionally includes wherein the portable device comprises an ear tag.

In Example 15, the subject matter of any one or more of Examples 13-14 optionally include wherein the portable device comprises an electronic collar.

In Example 16, the subject matter of any one or more of Examples 13-15 optionally include wherein the portable device comprises a radio frequency identification (RFID) tag.

In Example 17, the subject matter of any one or more of Examples 13-16 optionally include wherein the portable device comprises an Internet-of-Things (IoT) device.

In Example 18, the subject matter of any one or more of Examples 1-17 optionally include wherein to receive the indication of the animal being proximate to the restricted area, the communication system is to: communicate with a device on the animal to obtain a location of the animal; and compare the location of the animal with a geographical boundary of the restricted area.

In Example 19, the subject matter of Example 18 optionally includes wherein to communicate with the device on the animal, the communication system is to receive a regular transmission from the device on the animal, the regular transmission reporting the location of the animal.

In Example 20, the subject matter of any one or more of Examples 18-19 optionally include wherein to communicate with the device on the animal, the communication system is to: transmit a query to the device on the animal; and receive a response from the device on the animal, the response including the location.

In Example 21, the subject matter of any one or more of Examples 18-20 optionally include wherein to communicate with the device on the animal, the communication system is to implement a long range, low power communication protocol to communicate with the device on the animal.

In Example 22, the subject matter of any one or more of Examples 1-21 optionally include wherein to determine whether to activate the repellent device and the attractant device to maneuver the animal away from the restricted area, the processor is to: determine a current time; and determine whether the restricted area is actively restricted based on the current time.

In Example 23, the subject matter of any one or more of Examples 1-22 include wherein to activate the repellent device and the attractant device when the determination is positive, the processor is to activate the repellent device and the attractant device simultaneously.

In Example 24, the subject matter of any one or more of Examples 1-23 optionally include wherein to activate the repellent device and the attractant device when the determination is positive, the processor is to activate the repellent device and the attractant device in a temporal sequence.

In Example 25, the subject matter of Example 24 optionally includes wherein the temporal sequence is configurable.

In Example 26, the subject matter of any one or more of Examples 1-25 optionally include wherein to activate the repellent device and the attractant device when the determination is positive, the processor is to: activate the attractant device, the attractant device having a mean time of effectiveness; and activate the repellent device after the mean time of effectiveness.

In Example 27, the subject matter of any one or more of Examples 1-26 optionally include wherein to activate the repellent device and the attractant device when the determination is positive, the processor is to: activate the repellent device, the repellent device having a mean tune of effectiveness; and activate the attractant device after the mean time of effectiveness.

In Example 28, the subject matter of any one or more of Examples 1-27 optionally include wherein to activate the repellent device and the attractant device when the determination is positive, the processor is to: repeatedly activate the repellent device and the attractant device in an alternating sequence.

In Example 29, the subject matter of any one or more of Examples 1-28 optionally include wherein to activate the repellent device and the attractant device when the determination is positive, the processor is to: determine a type of the animal; and activate the repellent device and the attractant device based on the type of animal.

In Example 30, the subject matter of any one or more of Examples 1-29 optionally include wherein to activate the repellent device and the attractant device when the determination is positive, the processor is to: determine an identification of the animal; and activate the repellent device and the attractant device based on the identification.

In Example 31, the subject matter of any one or more of Examples 29-30 optionally include wherein the processor is to: determine an efficacy of the repellent device and the attractant device; and store the efficacy.

In Example 32, the subject matter of Example 31 optionally includes wherein the processor is to modify how the repellent device and attractant device are activated in a subsequent activation based on the efficacy.

Example 33 is a method of influencing animal behavior, the method comprising: receiving, at a monitoring system, an indication of an animal proximate to a restricted area; determining whether to activate a repellent device and an attractant device to maneuver the animal away from the restricted area; and activating the repellent device and the attractant device when the determination is positive.

In Example 34, the subject matter of Example 33 optionally includes wherein the monitoring system is incorporated into the repellent device.

In Example 35, the subject matter of any one or more of Examples 33-34 optionally include wherein the monitoring system is incorporated into the attractant device.

In Example 36, the subject matter of any one or more of Examples 33-35 optionally include wherein the monitoring system is incorporated into a user device.

In Example 37, the subject matter of any one or more of Examples 33-36 optionally include wherein receiving the indication of the animal being proximate to the restricted area comprises: receiving an animal identifier from a device deployed proximate to the restricted area.

In Example 38, the subject matter of Example 37 optionally includes wherein the device is the repellent device.

In Example 39, the subject matter of any one or more of Examples 37-38 optionally include wherein the device is the attractant device.

In Example 40, the subject matter of any one or more of Examples 37-39 optionally include wherein the animal identifier includes a unique identifier to uniquely identify the animal.

In Example 41, the subject matter of any one or more of Examples 37-40 optionally include wherein the animal identifier includes a code indicating a type of the animal.

In Example 42, the subject matter of any one or more of Examples 37-41 optionally include wherein the animal identifier includes a code indicating a gender of the animal.

In Example 43, the subject matter of any one or more of Examples 37-42 optionally include wherein the animal identifier includes a code indicating an age of the animal.

In Example 44, the subject matter of any one or more of Examples 37-43 optionally include wherein the animal identifier includes a code indicating a birthdate of the animal.

In Example 45, the subject matter of any one or more of Examples 37-44 optionally include wherein the animal identifier is stored on the animal in a portable device.

In Example 46, the subject matter of Example 45 optionally includes wherein the portable device comprises an ear tag.

In Example 47, the subject matter of any one or more of Examples 45-46 optionally include wherein the portable device comprises an electronic collar.

In Example 48, the subject matter of any one or more of Examples 45-47 optionally include wherein the portable device comprises a radio frequency identification (RFID) tag.

In Example 49, the subject matter of any one or more of Examples 45-48 optionally include wherein the portable device comprises an Internet-of-Things (IoT) device.

In Example 50, the subject matter of any one or more of Examples 33-49 optionally include wherein receiving the indication of the animal being proximate to the restricted area comprises: communicating with a device on the animal to obtain a location of the animal; and comparing the location of the animal with a geographical boundary of the restricted area.

In Example 51, the subject matter of Example 50 optionally includes wherein communicating with the device on the animal comprises receiving a regular transmission from the device on the animal, the regular transmission reporting the location of the animal.

In Example 52, the subject matter of any one or more of Examples 50-51 optionally include wherein communicating with the device on the animal comprises: transmitting a query to the device on the animal; and receiving a response from the device on the animal, the response including the location.

In Example 53, the subject matter of any one or more of Examples 50-52 optionally include wherein communicating with the device on the animal comprises implementing a long range, low power communication protocol to communicate with the device on the animal.

In Example 54, the subject matter of any one or more of Examples 33-53 optionally include wherein determining whether to activate the repellent device and the attractant device to maneuver the animal away from the restricted area comprises: determining a current time; and determining whether the restricted area is actively restricted based on the current time.

In Example 55, the subject matter of any one or more of Examples 33-54 optionally include wherein activating the repellent device and the attractant device when the determination is positive comprises activating the repellent device and the attractant device simultaneously.

In Example 56, the subject matter of any one or more of Examples 33-55 optionally include wherein activating the repellent device and the attractant device when the determination is positive comprises activating the repellent device and the attractant device in a temporal sequence.

In Example 57, the subject matter of Example 56 optionally includes wherein the temporal sequence is configurable.

In Example 58, the subject matter of any one or more of Examples 33-57 optionally include wherein activating the repellent device and the attractant device when the determination is positive comprises: activating the attractant device, the attractant device having a mean time of effectiveness; and activating the repellent device after the mean time of effectiveness.

In Example 59, the subject matter of any one or more of Examples 33-58 optionally include wherein activating the repellent device and the attractant device when the determination is positive comprises: activating the repellent device, the repellent device having a mean time of effectiveness; and activating the attractant device after the mean time of effectiveness.

In Example 60, the subject matter of any one or more of Examples 33-59 optionally include wherein activating the repellent device and the attractant device when the determination is positive comprises: repeatedly activating the repellent device and the attractant device in an alternating sequence.

In Example 61, the subject matter of any one or more of Examples 33-60 optionally include wherein activating the repellent device and the attractant device when the determination is positive comprises: determining a type of the animal; and activating the repellent device and the attractant device based on the type of animal.

In Example 62, the subject matter of any one or more of Examples 33-61 optionally include wherein activating the repellent device and the attractant device when the determination is positive comprises: determining an identification of the animal; and activating the repellent device and the attractant device based on the identification.

In Example 63, the subject matter of any one or more of Examples 61-62 optionally include determining an efficacy of the repellent device and the attractant device; and storing the efficacy.

In Example 64, the subject matter of Example 63 optionally includes modifying how the repellent device and attractant device are activated in a subsequent activation based on the efficacy.

Example 65 is at least one machine-readable medium including instructions, which when executed by a machine, cause the machine to perform operations of any of the methods of Examples 34-64.

Example 66 is an apparatus comprising means for performing any of the methods of Examples 34-64.

Example 67 is an apparatus for influencing animal behavior, the apparatus comprising: means for receiving an indication of an animal proximate to a restricted area; means for determining whether to activate a repellent device and an attractant device to maneuver the animal away from the restricted area; and means for activating the repellent device and the attractant device when the determination is positive.

In Example 68, the subject matter of Example 67 optionally includes wherein the apparatus is incorporated into the repellent device.

In Example 69, the subject matter of any one or more of Examples 67-68 optionally include wherein the apparatus is incorporated into the attractant device.

In Example 70, the subject matter of any one or more of Examples 67-69 optionally include wherein the apparatus is incorporated into a user device.

In Example 71, the subject matter of any one or more of Examples 67-70 optionally include wherein the means for receiving the indication of the animal being proximate to the restricted area comprise: means for receiving an animal identifier from a device deployed proximate to the restricted area.

In Example 72, the subject matter of Example 71 optionally includes wherein the device is the repellent device.

In Example 73, the subject matter of any one or more of Examples 71-72 optionally include wherein the device is the attractant device.

In Example 74, the subject matter of any one or more of Examples 71-73 optionally include wherein the animal identifier includes a unique identifier to uniquely identify the animal.

In Example 75, the subject matter of any one or more of Examples 71-74 optionally include wherein the animal identifier includes a code indicating a type of the animal.

In Example 76, the subject matter of any one or more of Examples 71-75 optionally include wherein the animal identifier includes a code indicating a gender of the animal.

In Example 77, the subject matter of any one or more of Examples 71-76 optionally include wherein the animal identifier includes a code indicating an age of the animal.

In Example 78, the subject matter of any one or more of Examples 71-77 optionally include wherein the animal identifier includes a code indicating a birthdate of the animal.

In Example 79, the subject matter of any one or more of Examples 71-78 optionally include wherein the animal identifier is stored on the animal in a portable device.

In Example 80, the subject matter of Example 79 optionally includes wherein the portable device comprises an ear tag.

In Example 81, the subject matter of any one or more of Examples 79-80 optionally include wherein the portable device comprises an electronic collar.

In Example 82, the subject matter of any one or more of Examples 79-81 optionally include wherein the portable device comprises a radio frequency identification (RFID) tag.

In Example 83, the subject matter of any one or more of Examples 79-82 optionally include wherein the portable device comprises an Internet-of-Things (IoT) device.

In Example 84, the subject matter of any one or more of Examples 67-83 optionally include wherein the means for receiving the indication of the animal being proximate to the restricted area comprise: means for communicating with a device on the animal to obtain a location of the animal; and means for comparing the location of the animal with a geographical boundary of the restricted area.

In Example 85, the subject matter of Example 84 optionally includes wherein the means for communicating with the device on the animal comprise means for receiving a regular transmission from the device on the animal, the regular transmission reporting the location of the animal.

In Example 86, the subject matter of any one or more of Examples 84-85 optionally include wherein the means for communicating with the device on the animal comprise: means for transmitting a query to the device on the animal; and means for receiving a response from the device on the animal, the response including the location.

In Example 87, the subject matter of any one or more of Examples 84-86 optionally include wherein the means for communicating with the device on the animal comprise means for implementing a long range, low power communication protocol to communicate with the device on the animal.

In Example 88, the subject matter of any one or more of Examples 67-87 optionally include wherein the means for determining whether to activate the repellent device and the attractant device to maneuver the animal away from the restricted area comprise: means for determining a current time; and means for determining whether the restricted area is actively restricted based on the current time.

In Example 89, the subject matter of any one or more of Examples 67-88 optionally include wherein the means for activating the repellent device and the attractant device when the determination is positive comprise means for activating the repellent device and the attractant device simultaneously.

In Example 90, the subject matter of any one or more of Examples 67-89 optionally include wherein the means for activating the repellent device and the attractant device when the determination is positive comprise means for activating the repellent device and the attractant device in a temporal sequence.

In Example 91, the subject matter of Example 90 optionally includes wherein the temporal sequence is configurable.

In Example 92, the subject matter of any one or more of Examples 67-91 optionally include wherein the means for activating the repellent device and the attractant device when the determination is positive comprise: means for activating the attractant device, the attractant device having a mean time of effectiveness; and means for activating the repellent device after the mean time of effectiveness.

In Example 93, the subject matter of any one or more of Examples 67-92 optionally include wherein the means for activating the repellent device and the attractant device when the determination is positive comprise: means for activating the repellent device, the repellent device having a mean time of effectiveness; and means for activating the attractant device after the mean time of effectiveness.

In Example 94, the subject matter of any one or more of Examples 67-93 optionally include wherein the means for activating the repellent device and the attractant device when the determination is positive comprise: means for repeatedly activating the repellent device and the attractant device in an alternating sequence.

In Example 95, the subject matter of any one or more of Examples 67-94 optionally include wherein the means for activating the repellent device and the attractant device when the determination is positive comprise: means for determining a type of the animal; and means for activating the repellent device and the attractant device based on the type of animal.

In Example 96, the subject matter of any one or more of Examples 67-95 optionally include wherein the means for activating the repellent device and the attractant device when the determination is positive comprise: means for determining an identification of the animal; and means for activating the repellent device and the attractant device based on the identification.

In Example 97, the subject matter of any one or more of Examples 95-96 optionally include means for determining an efficacy of the repellent device and the attractant device; and means for storing the efficacy.

In Example 98, the subject matter of Example 97 optionally includes means for modifying how the repellent device and attractant device are activated in a subsequent activation based on the efficacy.

Example 99 is at least one machine-readable medium including instructions for influencing animal behavior, which when executed by a monitoring system, cause the monitoring system to: receive an indication of an animal proximate to a restricted area; determine whether to activate a repellent device and an attractant device to maneuver the animal away from the restricted area; and activate the repellent device and the attractant device when the determination is positive.

In Example 100, the subject matter of Example 99 optionally includes wherein the monitoring system includes the repellent device.

In Example 101, the subject matter of any one or more of Examples 99-100 optionally include wherein the monitoring system includes the attractant device.

In Example 102, the subject matter of any one or more of Examples 99-101 optionally include wherein the monitoring system is incorporated into a user device.

In Example 103, the subject matter of any one or more of Examples 99-102 optionally include wherein the instructions to receive the indication of the animal being proximate to the restricted area include instructions to: receive an animal identifier from a device deployed proximate to the restricted area.

In Example 104, the subject matter of Example 103 optionally includes wherein the device is the repellent device.

In Example 105, the subject matter of any one or more of Examples 103-104 optionally include wherein the device is the attractant device.

In Example 106, the subject matter of any one or more of Examples 103-105 optionally include wherein the animal identifier includes a unique identifier to uniquely identify the animal.

In Example 107, the subject matter of any one or more of Examples 103-106 optionally include wherein the animal identifier includes a code indicating a type of the animal.

In Example 108, the subject matter of any one or more of Examples 103-107 optionally include wherein the animal identifier includes a code indicating a gender of the animal.

In Example 109, the subject matter of any one or more of Examples 103-108 optionally include wherein the animal identifier includes a code indicating an age of the animal.

In Example 110, the subject matter of any one or more of Examples 103-109 optionally include wherein the animal identifier includes a code indicating a birthdate of the animal.

In Example 111, the subject matter of any one or more of Examples 103-110 optionally include wherein the animal identifier is stored on the animal in a portable device.

In Example 112, the subject matter of Example 111 optionally includes wherein the portable device comprises an ear tag.

In Example 113, the subject matter of any one or more of Examples 111-112 optionally include wherein the portable device comprises an electronic collar.

In Example 114, the subject matter of any one or more of Examples 111-113 optionally include wherein the portable device comprises a radio frequency identification (RFID) tag.

In Example 115, the subject matter of any one or more of Examples 111-114 optionally include wherein the portable device comprises an Internet-of-Things (IoT) device.

In Example 116, the subject matter of any one or more of Examples 99-115 optionally include wherein the instructions to receive the indication of the animal being proximate to the restricted area include instructions to: communicate with a device on the animal to obtain a location of the animal; and compare the location of the animal with a geographical boundary of the restricted area.

In Example 117, the subject matter of Example 116 optionally includes wherein the instructions to communicate with the device on the animal include instructions to receive a regular transmission from the device on the animal, the regular transmission reporting the location of the animal.

In Example 118, the subject matter of any one or more of Examples 116-117 optionally include wherein the instructions to communicate with the device on the animal include instructions to: transmit a query to the device on the animal; and receive a response from the device on the animal, the response including the location.

In Example 119, the subject matter of any one or more of Examples 116-118 optionally include wherein the instructions to communicate with the device on the animal include instructions to implement a long range, low power communication protocol to communicate with the device on the animal.

In Example 120, the subject matter of any one or more of Examples 99-119 optionally include wherein the instructions to determine whether to activate the repellent device and the attractant device to maneuver the animal away from the restricted area include instructions to: determine a current time; and determine whether the restricted area is actively restricted based on the current time.

In Example 121, the subject matter of any one or more of Examples 99-120 optionally include wherein the instructions to activate the repellent device and the attractant device when the determination is positive include instructions to activate the repellent device and the attractant device simultaneously.

In Example 122, the subject matter of any one or more of Examples 99-121 optionally include wherein the instructions to activate the repellent device and the attractant device when the determination is positive include instructions to activate the repellent device and the attractant device in a temporal sequence.

In Example 123, the subject matter of Example 122 optionally includes wherein the temporal sequence is configurable.

In Example 124, the subject matter of any one or more of Examples 99-123 optionally include wherein the instructions to activate the repellent device and the attractant device when the determination is positive include instructions to: activate the attractant device, the attractant device having a mean time of effectiveness; and activate the repellent device after the mean time of effectiveness.

In Example 125, the subject matter of any one or more of Examples 99-124 optionally include wherein the instructions to activate the repellent device and the attractant device when the determination is positive includes instructions to: activate the repellent device, the repellent device having a mean time of effectiveness; and activate the attractant device after the mean time of effectiveness.

In Example 126, the subject matter of any one or more of Examples 99-125 optionally include wherein the instructions to activate the repellent device and the attractant device when the determination is positive includes instructions to: repeatedly activate the repellent device and the attractant device in an alternating sequence.

In Example 127, the subject matter of any one or more of Examples 99-126 optionally include wherein the instructions to activate the repellent device and the attractant device when the determination is positive includes instructions to: determine a type of the animal; and activate the repellent device and the attractant device based on the type of animal.

In Example 128, the subject matter of any one or more of Examples 99-127 optionally include wherein the instructions to activate the repellent device and the attractant device when the determination is positive includes instructions to: determine an identification of the animal; and activate the repellent device and the attractant device based on the identification.

In Example 129, the subject matter of any one or more of Examples 127-128 optionally include instructions to: determine an efficacy of the repellent device and the attractant device; and store the efficacy.

In Example 130, the subject matter of Example 129 optionally includes the instructions to modify how the repellent device and attractant device are activated in a subsequent activation based on the efficacy.

Example 131 is at least one machine-readable medium including instructions, which when executed by a machine, cause the machine to perform operations of any of the operations of Examples 1-130.

Example 132 is an apparatus comprising means for performing any of the operations of Examples 1-130.

Example 133 is a system to perform the operations of any of the Examples 1-130.

Example 134 is a method to perform the operations of any of the Examples 1-130.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A monitoring system for influencing animal behavior, the monitoring system comprising:
   a communication system to receive an indication of an animal proximate to a restricted area;
   a processor; and
   memory having instructions, which when executed by the processor, cause the processor to:
      determine whether to activate a repellent device and an attractant device to maneuver the animal away from the restricted area; and
      activate the repellent device and the attractant device when the determination is positive, wherein the activate the repellent device and the attractant device, the processor is to:
         activate one of: the attractant device or the repellant device, the attractant device having a first mean time of effectiveness, the repellant device having a second mean time of effectiveness; and
         activate the other of the: the attractant device or repellent device, after the corresponding first or second mean time of effectiveness.

2. The system of claim 1, wherein to receive the indication of the animal being proximate to the restricted area, the processor is to:
   receive an animal identifier from a device deployed proximate to the restricted area.

3. The system of claim 2, wherein the device is the repellent device.

4. The system of claim 2, wherein the device is the attractant device.

5. The system of claim 2, wherein the animal identifier includes a unique identifier to uniquely identify the animal.

6. The system of claim 2, wherein the animal identifier includes a code indicating a birthdate of the animal.

7. The system of claim 1, wherein to receive the indication of the animal being proximate to the restricted area, the communication system is to:
   communicate with a device on the animal to obtain a location of the animal; and
   compare the location of the animal with a geographical boundary of the restricted area.

8. The system of claim 1, wherein to determine whether to activate the repellent device and the attractant device to maneuver the animal away from the restricted area, the processor is to:
   determine a current time; and
   determine whether the restricted area is actively restricted based on the current time.

9. The system of claim 1, wherein to activate the repellent device and the attractant device when the determination is positive, the processor is to activate the repellent device and the attractant device simultaneously.

10. The system of claim 1, wherein to activate the repellent device and the attractant device when the determination is positive, the processor is to activate the repellent device and the attractant device in a temporal sequence.

11. The system of claim 10, wherein the temporal sequence is configurable.

12. The system of claim 1, wherein to activate the repellent device and the attractant device when the determination is positive, the processor is to:
   repeatedly activate the repellent device and the attractant device in an alternating sequence.

13. The system of claim 1, wherein to activate the repellent device and the attractant device when the determination is positive, the processor is to:
   determine a type of the animal; and
   activate the repellent device and the attractant device based on the type of animal.

14. The system of claim 1, wherein to activate the repellent device and the attractant device when the determination is positive, the processor is to:
   determine an identification of the animal; and
   activate the repellent device and the attractant device based on the identification.

15. The system of claim 14, wherein the processor is to:
   determine an efficacy of the repellent device and the attractant device; and
   store the efficacy.

16. The system of claim 15, wherein the processor is to modify how the repellent device and attractant device are activated in a subsequent activation based on the efficacy.

17. A method of influencing animal behavior, the method comprising:
   receiving, at a monitoring system, an indication of an animal proximate to a restricted area;
   determining whether to activate a repellent device and an attractant device to maneuver the animal away from the restricted area; and
   activating the repellent device and the attractant device when the determination is positive by:
      activating one of: the attractant device or the repellant device, the attractant device having a first mean time of effectiveness, the repellant device having a second mean time of effectiveness; and
      activating the other of the: the attractant device or repellent device, after the corresponding first or second mean time of effectiveness.

18. The method of claim 17, wherein receiving the indication of the animal being proximate to the restricted area comprises:
   communicating with a device on the animal to obtain a location of the animal; and comparing the location of the animal with a geographical boundary of the restricted area.

19. At least one non-transitory machine-readable medium including instructions for influencing animal behavior, which when executed by a monitoring system, cause the monitoring system to:
  receive an indication of an animal proximate to a restricted area;
  determine whether to activate a repellent device and an attractant device to maneuver the animal away from the restricted area; and
  activate the repellent device and the attractant device when the determination is positive by:
    activating one of: the attractant device or the repellant device, the attractant device having a first mean time of effectiveness, the repellant device having a second mean time of effectiveness; and
    activating the other of the: the attractant device or repellent device, after the corresponding first or second mean time of effectiveness.

20. The at least one non-transitory machine-readable medium of claim 19, further comprising instructions to:
  determine an efficacy of the repellent device and the attractant device; and
  store the efficacy.

21. The at least one non-transitory machine-readable medium of claim 20, further comprising the instructions to modify how the repellent device and attractant device are activated in a subsequent activation based on the efficacy.

* * * * *